(12) United States Patent
Park et al.

(10) Patent No.: US 7,688,299 B2
(45) Date of Patent: Mar. 30, 2010

(54) INTERPOLATION DEVICE FOR USE IN A DISPLAY APPARATUS AND INTERPOLATION METHOD

(75) Inventors: Bong-Im Park, Cheonan-si (KR); Woo-Chul Kim, Uijeongbu-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 258 days.

(21) Appl. No.: 11/856,987

(22) Filed: Sep. 18, 2007

(65) Prior Publication Data

US 2008/0069479 A1    Mar. 20, 2008

(30) Foreign Application Priority Data

Sep. 20, 2006    (KR) ............... 10-2006-0091391

(51) Int. Cl.
*G09G 3/36* (2006.01)
(52) U.S. Cl. .................. 345/89; 345/98; 345/99; 345/100; 345/690
(58) Field of Classification Search ........... 345/87–104, 345/204–215, 690
See application file for complete search history.

(56) References Cited

U.S. PATENT DOCUMENTS

| 2007/0285712 | A1* | 12/2007 | Komada | 358/1.15 |
| 2008/0114247 | A1* | 5/2008 | Urbano et al. | 600/447 |
| 2008/0114248 | A1* | 5/2008 | Urbano et al. | 600/447 |

* cited by examiner

*Primary Examiner*—Vijay Shankar
(74) *Attorney, Agent, or Firm*—Innovation Counsel LLP

(57) ABSTRACT

In an interpolation device that is used for driving a liquid crystal display (LCD), a memory stores an image signal representing a previously displayed image frame. A look-up table (LUT) stores plural reference data corresponding to differences between values of high order bits of a present image signal and a previous image signal. An arithmetic unit receives low order bits of the present image signal, low order bits of the previous image signal, and the reference data from the LUT to output a corrected image signal. The arithmetic unit applies a first second-order interpolation equation when the high order bits of the present image signal are identical to the high order bits of the previous image signal and applies a second second-order interpolation equation, which is different from the first second-order interpolation equation, when the high order bits of the present image signal are different from the high order bits of the previous image signal.

30 Claims, 5 Drawing Sheets

INTERPOLATION DEVICE FOR USE IN A DISPLAY APPARATUS AND INTERPOLATION METHOD

CROSS-REFERENCE TO RELATED APPLICATION

This application relies for priority upon Korean Patent Application No. 2006-91391 filed on Sep. 20, 2006, the disclosure of which is herein incorporated by reference in its entirety.

BACKGROUND

1. Field of Invention

The present disclosure of invention relates to an interpolation device that is usable in a display apparatus such as one that charges image pixels to desired voltage levels. More particularly, the present disclosure relates to an interpolation device capable of providing accurate interpolation for serial image signals having values for which corrections are not directly defined by a lookup table.

2. Description of Related Art

Generally, liquid crystal displays provide a desired voltage between two electrodes of a given pixel unit in order to apply an electric field to a liquid crystal material layer of the unit, where the desired voltage defines an intensity of an electric field to thereby control the transmittance of light passing through the liquid crystal material layer, thereby obtaining a desired image intensity from the given pixel unit. In order to prevent the image from being deteriorated by a unidirectional electric field applied to the liquid crystal layer for a long time, a reversal drive method is often employed with liquid crystal displays to periodically reverse a polarity of data voltage with respect to a common voltage. Such polarity reversal may occur on a frame-by-frame basis or longer, on a column basis, a row basis, or a dot-by-dot basis. Irrespective of how often polarity reversal occurs, when imagery changes from frame to frame, voltage across the electrodes of the pixel unit has to be driven from a first level to a different second level.

Recently, liquid crystal displays have adopted a dynamic capacitance charging compensation (DCCC) scheme to improve the response speed at which liquid crystals change state. According to the DCCC scheme, a modified data voltage is applied for a present frame in place of an original data voltage (hereinafter, also referred to as "present data voltage") where the modified data voltage includes a compensation for the difference between the desired present data voltage to be formed across the pixel capacitance and a data voltage remaining on the capacitance from a previous frame (hereinafter, referred to as "previous data voltage"). This compensation helps to increase the speed at which the liquid crystal capacitor is charged to the desired present data voltage.

In terms of more detail, if an absolute value of potential difference between the previous data voltage and the desired present data voltage is greater than a preset reference value, the liquid crystal display adopting the DCCC scheme has applied to it a drive voltage greater than the desired present data voltage so as to thereby increase the charge speed of the equivalent RC circuit (resistor-capacitor circuit) associated with the liquid crystal capacitor.

In one class of embodiments, a lookup table (LUT) is used to determine the magnitude of the charge-hurrying drive voltage. In order to limit the amount of storage memory space needed by the LUT and according to one approach, only the more significant bits (MSB's) of the pixel data are used. An imprecise (linear and symmetrical) interpolation equation is used for dealing with small differences of gray scale. Since such an imprecise interpolation equation may fail to provide correct drive voltages in cases where there are moderate differences of gray scales between the previous data voltage and the desired present data voltage rather than very large differences or essentially no differences, the display system can fail to display subtle changes of gray scale across an image, thereby depriving viewers of the image resolution intended by the original data.

SUMMARY

In accordance with the disclosure, an improved interpolation device is provided that is capable of more exactly interpolating a present image signal not only in display areas where there are relatively large (coarse) differences of gray scale values from frame to frame, but also in display areas representing moderate (finer) differences of gray scales from frame to frame between the previous image signal level of a given pixel and the desired present image signal level for the pixel.

The present disclosure of invention also provides a display apparatus employing the improved interpolation device.

The present disclosure of invention also provides an interpolation method suitable for the more precise interpolation of an image signal.

In one embodiment, an improved interpolation device includes a signal delay memory, a look-up table (LUT), and an arithmetic logic unit (ALU) where the ALU is configured to carry out the improved interpolation process.

The signal delaying memory stores an image signal level of a given pixel as applied one image frame previously. In this way, an image signal level of a given pixel in a previous frame (a previous image signal) can be read out from the memory during a present frame, and an image signal level of the given pixel in the present frame (a present image signal) can be written into the memory for use in the next frame. The look-up table (LUT) stores plural items of reference data that are usable by a first compensation algorithm that responds to differences among the more significant bits (MSB's). The ALU includes a second compensation algorithm that responds to differences among the less significant bits (LSB's). The look-up table receives the previous image signal from the memory and the present image signal and performs a lookup table function to thereby output a reference data signal (f) corresponding to there being a difference between the higher order bits (MSB's) of the present image signal and the higher order bits (MSB's) of the previous image signal. The arithmetic unit (ALU) however, receives not only the LUT output signal f(n,n−1), but also the higher order bits (MSB's) and the lower order bits (LSB's) respectively of the present image signal and the previous image signal, and processes these so as to output a compensated image signal that accounts for differences among the LSB's as well as differences among the MSB's. In the case where the MSB's of the previous and current frame pixel values are identical, and thus the LUT output signal f(n,n−1) provides no adjustment, the ALU nonetheless tests the LSB's of the previous and current frame pixel values. If the LSB's are not the same, the arithmetic unit applies a first second-order interpolation equation for compensating for the differences among the LSB's.

In one embodiment, a display apparatus includes a memory, a look-up table, a timing controller, a data driving circuit, a gate driving circuit, and a display panel.

The memory stores an image signal in one frame unit. If an image signal of a previous frame (a previous image signal), which is previously stored, is read out from the memory during a present frame, an image of the present frame (a present image signal) is written into the memory. The look-up table stores plural reference data. The look-up table receives the previous image signal from the memory and the present image signal to output reference data corresponding to high order bits of the present image signal and high order bits of the previous image signal.

The timing controller receives low order bits of the present image signal, low order bits of the previous image signal, and the reference data to output a corrected image signal, and receives a control signal from an external device to output a data control signal and a gate control signal. The timing controller applies a first second-order interpolation equation when the high order bits of the present image signal are identical to the high order bits of the previous image signal and applies a second second-order interpolation equation, which is different from the first second-order interpolation equation, when the high order bits of the present image signal are different from the high order bits of the previous image signal.

The data driving circuit receives the corrected image signal in synchronization with the data control signal and converts the corrected image signal into data voltage to output the data voltage. The gate driving circuit sequentially outputs gate pulses in synchronization with the gate control signal. The display panel receives the data voltage in response to the gate pulse to display an image.

An automated interpolation method may be provided in accordance with the disclosure as follow. An image signal of a previous frame (a previous image signal) and an image signal of a present frame (a present image signal) are received. Reference data corresponding to high order bits of the present image signal and high order bits of the previous image signal are output. Low order bits of the present image signal, low order bits of the previous image signal, and the reference data are received, and a corrected image signal is output by applying a first second-order interpolation equation when the high order bits of the present image signal are identical to the high order bits of the previous image signal and applying a second second-order equation, which is different from the first second-order equation, when the high order bits of the present image signal are different from the high order bits of the previous image signal.

According to the above, the corrected image signal is obtained by applying the first second-order interpolation equation when the high order bits of the present image signal are identical to the high order bits of the previous image signal and applying the second second-order interpolation equation, which is different from the first second-order interpolation equation, when the high order bits of the present image signal are different from the high order bits of the previous image signal, thereby reducing interpolation errors. It is to be understood that the equation-defined corrective actions or correction generating functions described herein may be implemented by use of sequential state machines, digital signal processors and/or by series of predefined arithmetic logic units as may be appropriate in respective applications for realizing the desired goals.

BRIEF DESCRIPTION OF THE DRAWINGS

The above and other advantages of the present disclosure will become more readily apparent by reference to the following detailed description when considered in conjunction with the accompanying drawings wherein.

DETAILED DESCRIPTION

Figure 1:
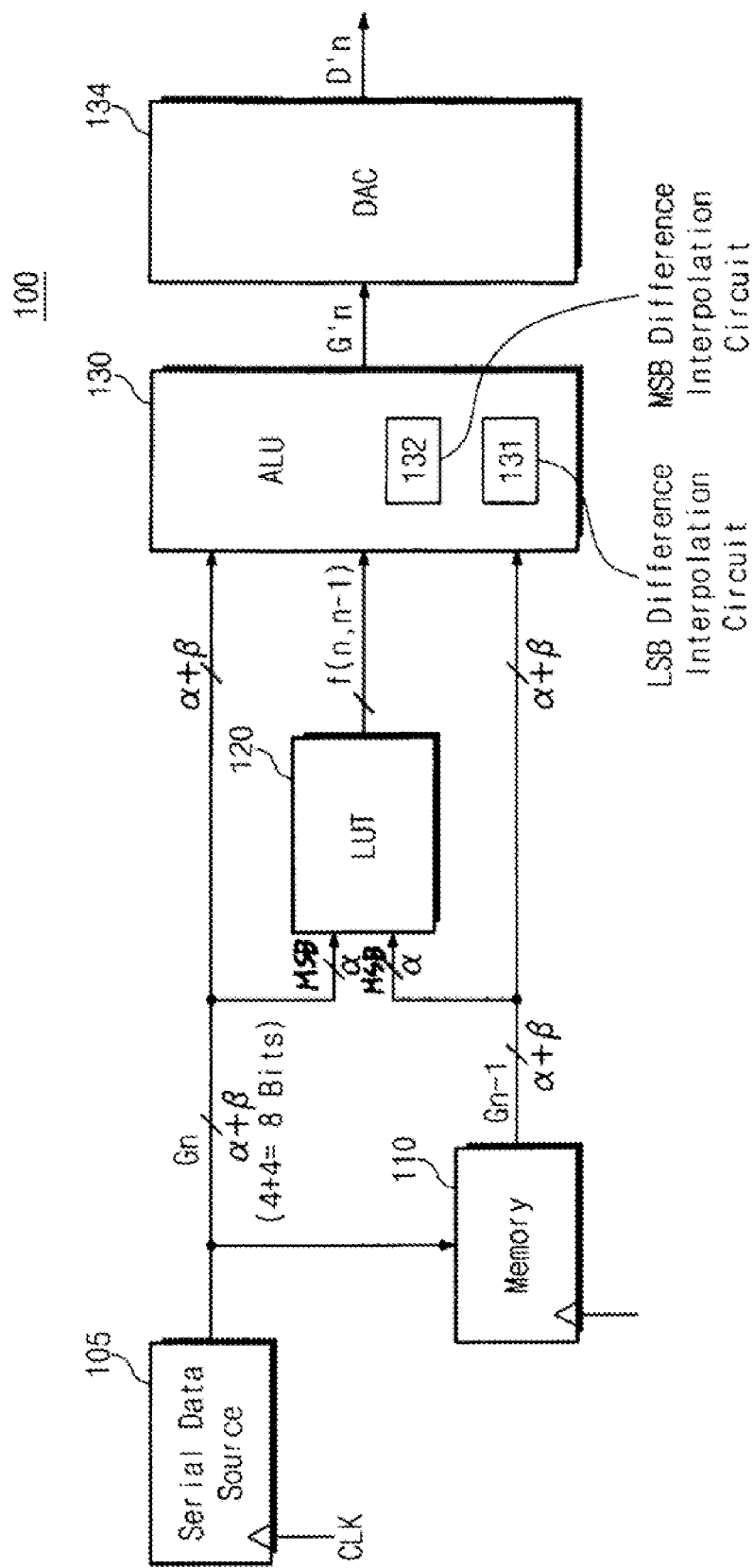
FIG. 1 is a block diagram showing an exemplary embodiment of a display system including an interpolation device according to the present disclosure.
Figure 2:
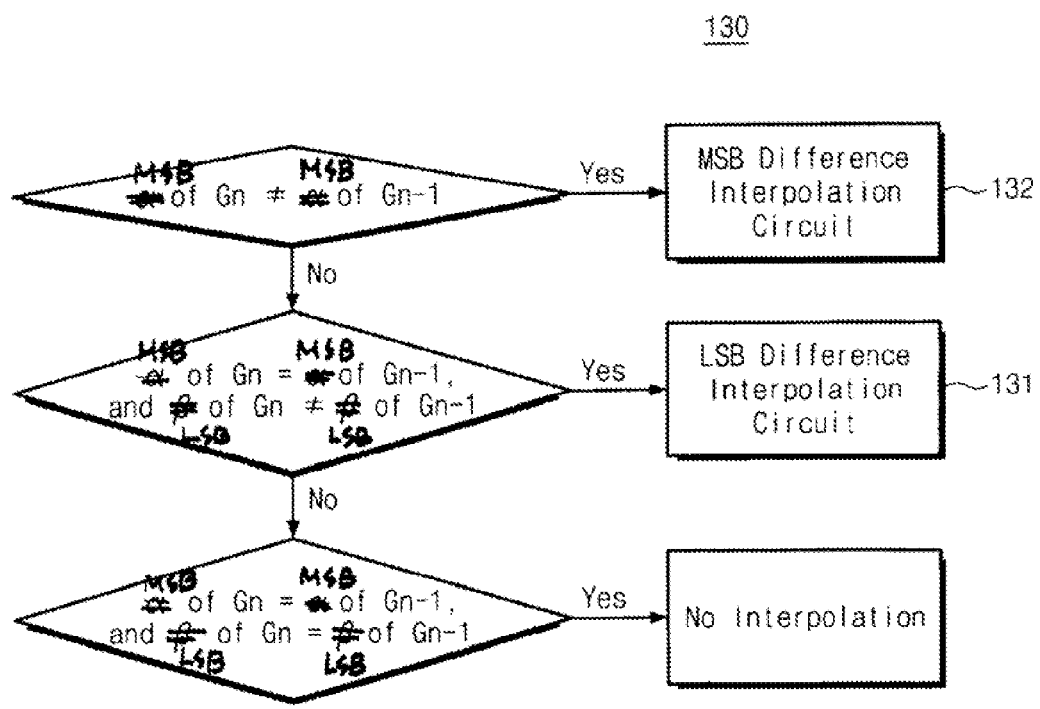
FIG. 2 is a flow chart for explaining when each of different interpolation algorithms are used.
Figure 3:
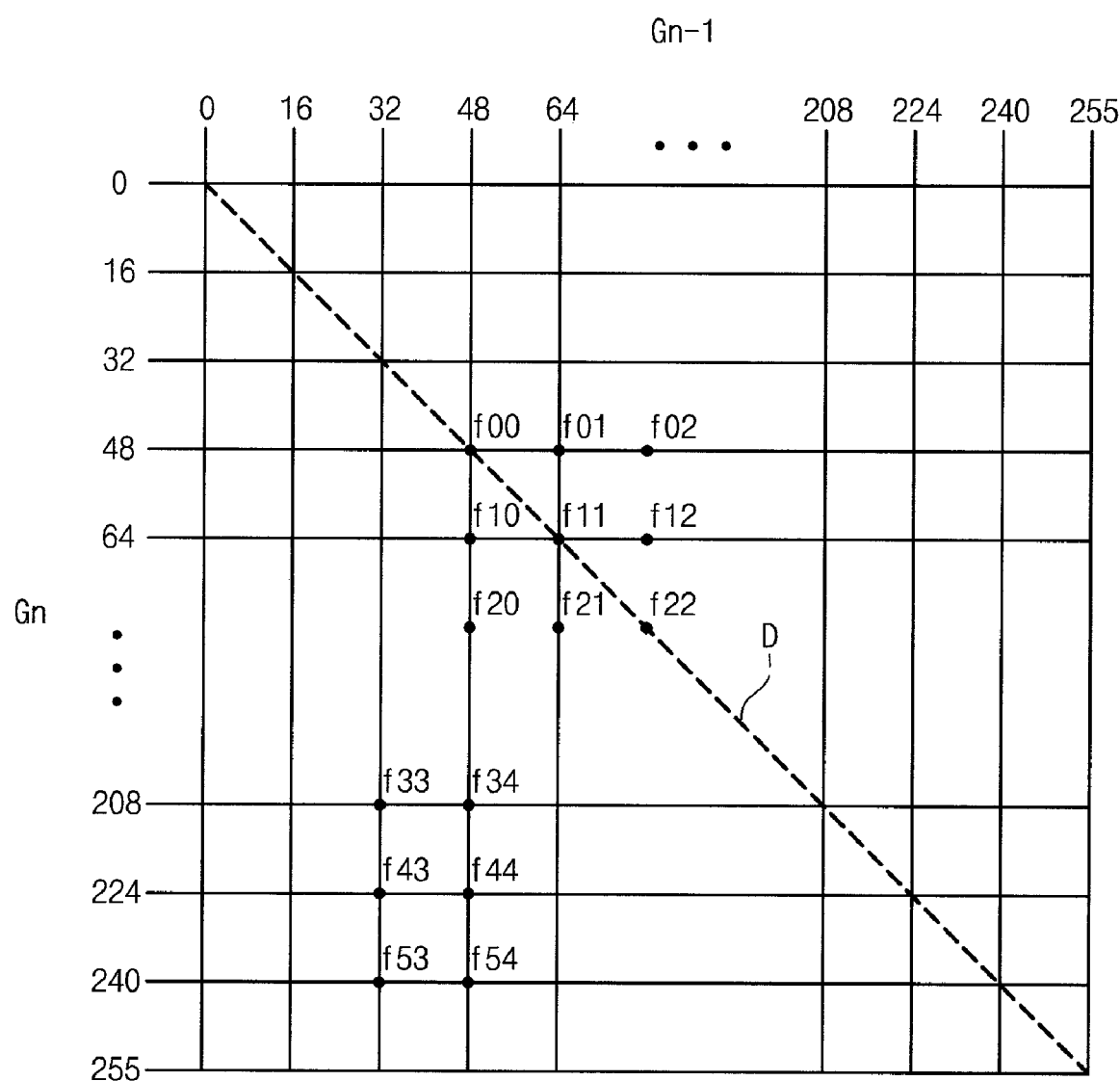
FIG. 3 is a view showing a data structure for a look-up table such as used in FIG. 1.

FIG. 1 is a block diagram showing an exemplary embodiment 100 including an interpolation device according to the present disclosure, FIG. 2 is a flow chart showing one way in which the system 100 may be operated and FIG. 3 is a view showing a data structure for the look-up table 120 of FIG. 1.

Referring to FIG. 1, the embodiment 100 includes a signal delay memory 110, a look-up table (LUT) 120, and an arithmetic unit (ALU) 130. The ALU 130 couples to a digital-to-analog converter (DAC) 134 whose output is sampled (as a pulse) for charging or discharging a corresponding LCD pixel (equivalent to an RC network) to a desired state.

The memory 110 is a frame memory, and stores an input image signal for each pixel in one image frame. In detail, upon receiving and storing an image signal $G_n$ for a given pixel (having a corresponding time constant $RC_{LCD}$) of a present frame (hereinafter, referred to as "a present image signal), the memory also reads out an image signal $G_{n-1}$ of the same pixel unit from a previous frame (hereinafter, referred to as "a previous image signal).

More significant portions (107, 117) of the present image signal $G_n$ and the previous image signal $G_{n-1}$ read out from the memory 110 are input into the look-up table 120. In the present exemplary embodiment, the higher order bits of the present image signal Gn and of the previous image signal Gn−1 each consist of a first number, $\alpha$ of bits, and the low order bits thereof each consist of a second number, $\beta$ of bits. In one embodiment, $\alpha=4$ and $\beta=4$. Other values may be used however as deemed appropriate for a given application. For example, an alternate embodiment may use $\alpha=3$ and $\beta=5$ or $\alpha=5$ and $\beta=3$ or $\alpha=6$ and $\beta=10$.

As shown in FIG. 3, the look-up table 120 stores reference data only with respect to the one to one permutations $(2^\alpha+1)\times(2^\alpha+1)$ determined by the number $\alpha$ of the high order bits. FIG. 3 shows a data map corresponding to the data structure used in the look-up table 120 when the high order bits of the present image signal Gn and the previous image signal Gn−1 each consist of four bits according to one embodiment ($\alpha=4$). Accordingly, the look-up table 120 includes 17×17 data instance lines (17 vertical longitude lines and 17 horizontal latitude lines) that define 16×16 square blocks. On the assumption that the present image signal Gn and the previous image signal Gn−1 each consist of 8 bits, if the number $\alpha$ of the high order bits is four, then the number $\beta$ of the low order bits is four and the highest complete value attainable by the 8 binary bits is decimal 255 while the lowest is decimal 0. In the present exemplary embodiment, a data value interval between the top corner of a first square block and the top corner of a next immediate block is defined as $N=2^\beta$. For example, 64−48=16 as is seen when moving from the LUT data point denoted as $f_{00}$ either to LUT data point $f_{01}$ on its right or to data point $f_{10}$ below it.

In the representation in FIG. 3 of look-up table 120, the markings on the horizontal axis represents different values for the MSB's of the previous image signal Gn−1, and the markings on the vertical axis represents different values for the MSB's of the present image signal Gn. In the interval along the vertical side of a given square box in FIG. 3, but before reaching the next major latitude line, the high order bits of the present image signal Gn remain the same (unchanged) while the lower order bits increment in additive value from decimal 0 to decimal 15. In the interval along the horizontal side of a given square box, but before reaching the next major longitude line, the high order bits of the previous image signal Gn−1 remain the same although the lower order bits are changing in additive value from decimal 0 to decimal 15. In addition, both the lower and higher order bits of the present image signal Gn are the same as the respective lower and high order bits of the previous image signal Gn−1 along the dashed major diagonal line D drawn through the mapping of look-up table 120 from coordinate point (0, 0) to point (255, 255). Meanwhile, in other places the lower order bits of the present image signal Gn differ from the lower order bits of the previous image signal Gn−1 in each non-diagonal area of each illustrated block of FIG. 3.

The arithmetic unit (ALU) 130 receives the reference data signal(f) output by the LUT 120 and also the higher and lower order bits ($\alpha+\beta$) of the present image signal Gn and the higher and lower order bits ($\alpha+\beta$) of the previous image signal Gn−1, and combines these in various ways to thereby generate a corrected image signal Gn' using pre-established LSB interpolation circuits 131 and MSB interpolation circuit 132 or neither of those circuits/processes.

FIG. 2 is a flow chart showing one possible method of operating ALU 130. If the MSB's are found to differ from one another, then the MSB interpolation circuit 132 is used. On the other hand, if only the LSB's are found to differ from one another, then the LSB interpolation circuit 131 is used. If the MSB's and LSB's of the current and previous frame are found to be the same, then no interpolation is used. It is to be understood that although the illustrated embodiment checks for sameness among all the LSB's it is within the contemplation of the disclosure to check for sameness among only a higher subset of the LSB's and to ignore differences among a predefined subset of the least significant bits if such is appropriate in a given application.

More specifically and in accordance with disclosure, the arithmetic unit 130 produces the corrected image signal Gn' by a selected one of the LSB and MSB interpolation circuits 131 and 132 where the selection depends on whether the high order bits of the present image signal $G_n$ are the same as the high order bits of the previous image signal $G_{n-1}$ or not; and on whether even if the MSB's are the same, if all or a predefined upper subset of the LSB's are the same. In FIG. 3, the high order bits of $G_n$ and of $G_{n-1}$ are the same for each block whose center lies on the dashed major diagonal D of FIG. 3. Each such on-the-diagonal block is hereinafter also referred to as "a low gray-scale difference block". This indicates that two conditions are met, namely, the MSB's are the same but the LSB's can still be different. In all other blocks of FIG. 3, the high order bits of $G_n$ and of $G_{n-1}$ are different because the left-to-right downsloping diagonal of that block lies off the dashed major diagonal D of FIG. 3. Each such off-the-major-diagonal block is hereinafter also referred to as "a high gray-scale difference block".

When an off-the-major-diagonal block lies immediately adjacent to two on-the-diagonal blocks, the difference between the $G_n$ and $G_{n-1}$ higher order bits of that immediately adjacent block is no more than one higher order bit. In one embodiment, this too may be considered a relatively small difference of gray scale values. In light of this, so-called quad-blocks will be considered (see 121 of FIG. 4) where a quad-block consists of two immediately adjacent, on-the-major-diagonal blocks and the two off-the-diagonal blocks that are each immediately adjacent to the two on-the-major-diagonal blocks.

Typically the reference data points (i.e., f00, f01, f02, etc.) stored in the look-up table 120 represent a non-linear function that is determined by trial and error for example to compensate for the specific RC characteristics of a given LCD panel. When the numbers are analyzed inside the look-up table 120, it is often found that the reference data series extending down a column direction (vertically in FIG. 3) is more nonlinear than that of the reference data series extending horizontally in a row direction in the mapping of the look-up table 120.

Because the LUT reference data points (i.e., f00, f01, f02, etc.) represent nonlinear value series (especially when moving continuously in the column direction of FIG. 3), if only a linear (first-order) interpolation equation is used to correct for differences between the low order bits especially for those of the on-the-major-diagonal blocks where the MSB's are the same; significant image production errors may occur due to the linear interpolation process not accounting for the typically nonlinear nature of the behavior of the corresponding LCD panel.

In accordance with the disclosure, the arithmetic unit (ALU) 130 of FIG. 1 calculates its corrected image signal Gn' by using a second-order interpolation equation at least with respect to the amount of difference in the column direction between the LSB's of a current and previous image signal, thereby reducing the interpolation errors.

Figure 4:
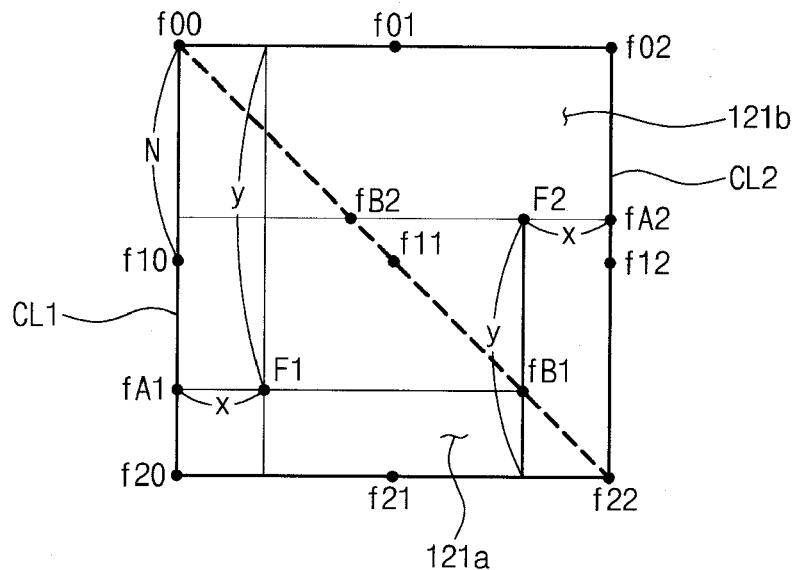
FIG. 4 is a view illustrating a method of calculating a corrected image signal in an on-diagonal quad-block representing a low gray-scale difference.

FIG. 4 is a view illustrating a method of calculating the corrected image signal in a low gray-scale difference quad-block 121.

Referring to FIG. 4, and more specifically to the illustrated low gray-scale difference quad block 121 (in which the high order bits of the present image signal Gn are the same as, or one off from the high order bits of the previous image signal Gn−1), it is to be noted that this data structure 121 defines a square that includes the following first through ninth LUT reference data points: f00, f10, f20, f01, f11, f21, f02, f12, and f22.

The low gray-scale difference quad-block 121 may be divided along its part of the major diagonal (D) into a lower triangular area 121a that includes the following LUT reference data points: f00, f10, f20, f11, f21, and f22 and into an upper triangular area 121b that includes the following LUT reference data points: f00, f01, f11, f02, f12, and f22. In this case, the lower triangular area 121a exists below the dashed major diagonal line D and it (121a) is defined as a rising signal part because the present image signal $G_n$ is greater than the previous image signal $G_{n-1}$ and thus the G'n output of ALU 130 needs to drive the capacitance CLCD of the corresponding pixel to a higher potential. The upper triangular area 121b exists above the diagonal line D and it (121b) is defined as a falling signal part because the present image signal $G_n$ is smaller than the previous image signal $G_{n-1}$ and thus the G'n output of ALU 130 needs to drive capacitance CLCD of the corresponding pixel to a lower potential.

Details will now be provided regarding the calculation procedure of first, the rising-signal interpolation method, for a given set of input coordinates corresponding to function point F1 as practiced in the case where as illustrated, the given input coordinates for F1 are located in the lower triangular area 121a and therefore the present image signal $G_n$ is greater than the previous image signal Gn−1.

A first reference equation component, $fA1$ for the input coordinates corresponding to function point F1, is formed as a first second-order equation which is calculated by using as its input parameters, the first to third LUT reference data points: f00, f10, and f20 found along a first vertical or column line CL1 of the lower triangular area 121a. This vertical or columnar correction component, $fA1$ of the corrected image signal Gn' may be calculated according to the following Equation 1.

$$fA1 = a_1 y^2 + b_1 y + c_1, \quad \text{Equation 1}$$

wherein $a_1 = \dfrac{1}{4N}(f20 - 2f10 + f00)$, $b_1 =$ $$\dfrac{1}{4N}(-f20 + 4f10 - 3f00) - \dfrac{y0}{2N^2}(f20 - 2f10 + f00),$$

and $c_1 = f00 - a_1 y0^2 - b_1 y0$.

In Equation 1, $N=2^\beta$ denotes the interval of a block, y denotes a value obtained by dividing the value represented by the low order bits of the present image signal Gn by N of the blocks, and $y0$ denotes a value of y used to obtain (approximately recreate) the first reference data value f00 from first reference equation $fA1$.

A second reference equation component $fB1$ (for the input coordinates corresponding to function point F1) is formed as a first-order function from an equation that uses as its input parameters, the first and fifth LUT reference data values, f00 and f11 existing on the diagonal line D or hypotenuse of the lower triangular area 121a.

Second reference equation $fB1$ is defined as Equation 2.

$$fB1 = f00 + y \quad \text{Equation 2}$$

In Equation 2, y is again the value obtained by dividing the low order bits of the present image signal Gn by the interval value N of a given block.

A combined first interpolation value for the illustrated lower triangle input coordinates of position F1 in the lower triangular area 121a is defined by a proportional equation using the first and second reference component equations $fA1$ and $fB1$.

The following proportional equation is established for the lower triangular area 121a by noting that all rectangles having major diagonal D as their diagonal are squares and thus their horizontal side dimension is the same as their vertical side dimension. (Thus the distance in the horizontal direction between the points of fB1 and fA1 is equal to y, the distance in the vertical direction between the points of f00 and fA1.)

$$x:y = (F1 - fA1):(fB1 - fA1) \quad \text{Equation 3}$$

Accordingly, first combined interpolation value F1 in the lower triangular area 121a is finally generated in accordance with the following Equation 4.

$$F1 = (1 - b_1)x + b_1 y - a_1 xy + (f00 - c_1)\dfrac{x}{y} + a_1 y^2 + c_1 \quad \text{Equation 4}$$

In Equations 3 and 4, x denotes a value obtained by dividing the low order bits of the previous image signal $G_{n-1}$ by N the interval of a given block.

As a result, if the present image signal $G_n$ is greater than the previous image signal ($G_{n-1}$), the arithmetic unit 130 (shown in FIG. 1) operates in accordance with the equations set forth above and calculates the corrected image signal Gn' in accordance with the first interpolation for deriving F1.

The corrected image signal Gn' is obtained by using a different second interpolation algorithm F2 if the input condition falls into the upper triangular area 121b in which the present image signal $G_n$ is smaller than the previous image signal $G_{n-1}$.

A third reference component equation $fA2$ is formed as a second-order equation and is computed based on the seventh, eighth, and the ninth LUT reference data points: f02, f12, and f22 existing along the second column line CL2 of the upper triangular area 121b. The column component of the corrected image signal Gn' may be computed through third reference equation $fA2$.

Third reference equation $fA2$ is defined as Equation 5.

$$fA2 = a_2 y^2 + b_2 y + c_2, \quad \text{Equation 5}$$

wherein $a_2 = \dfrac{1}{4N}(f20 - 2f12 + f22)$, $b_2 =$ $$\dfrac{1}{4N}(-f02 + 4f12 - 3f22) - \dfrac{y2}{2N^2}(f02 - 2f12 + f22),$$

and $c_2 = f22 - a_2 y2^2 - b_2 y2$.

In Equation 5, N denotes the interval between the blocks, y denotes a value obtained by dividing the low order bits of the present image signal Gn by the interval N between the blocks, and y2 denotes a value of y used to obtain the ninth reference data f22 from third reference equation $fA2$.

A fourth reference component equation $fB2$ is formed as a first-order equation obtained by using as input parameters, the fifth and ninth reference data f11 and f22 existing on the diagonal line D.

Fourth reference equation $fB2$ is defined as Equation 6.

$$fB2 = f22 + y \quad \text{Equation 6}$$

In Equation 6, y is a value obtained by dividing the low order bits of the present image signal Gn by N between the blocks.

Second interpolation equation F2 is defined by a proportional equation of third and fourth reference equations $fA2$ and $fB2$.

The following proportional equation is established in the upper triangular block 121b.

$$x:y = (fA2 - F2):(fA2 - fB2) \quad \text{Equation 7}$$

Accordingly, second interpolation equation F2 is defined as Equation 8.

$$F2 = (1 - b_2)x + b_2 y - a_2 xy + (f22 - c_2)\dfrac{x}{y} + a_2 y^2 + c_2 \quad \text{Equation 8}$$

In Equations 7 and 8, x denotes a value obtained by diving the low order bits of the previous image signal Gn−1 by N.

As a result, if the present image signal Gn is smaller than the previous image signal (Gn−1), the arithmetic unit 130 generates the corrected image signal Gn' through use of the second interpolation process for deriving F2.

If the corrected image signal Gn' is calculated through Equations 4 and 8 in the low gray-scale difference quad-block 121 including the diagonal line D as described above, the present image signal Gn will be correct to a high degree of accuracy. In other words, since the gradient of the lower triangular area 121a differs from the gradient of the upper triangular area 121b in the look-up table 120 (shown in FIG. 1) due to the characteristic of liquid crystal model, different first and second interpolation equations F1 and F2 are respectively employed for the lower and upper triangular areas 121a and 121b, so that the present image signal Gn may be accurately generated by use of nonlinear interpolation.

Meanwhile, if the previous image signal Gn−1 is exactly the same as the present image signal Gn, in one embodiment, the corrected image signal G'n is the same as the present image signal Gn. In an alternate embodiment, the corrected image signal G'n may be slightly higher so as to compensate for possible leakage resistance in the RC model of the LCD pixel.

Figure 5:
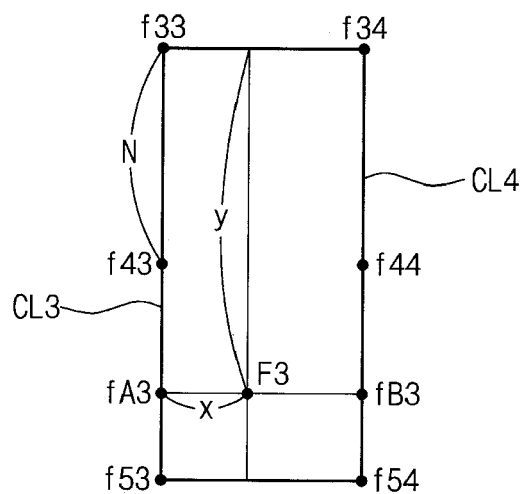
FIG. 5 is a view illustrating a method of calculating a corrected image signal in an off-diagonal duet-block representing a high gray-scale difference.

FIG. 5 is a view illustrating a method that may be used for generating the corrected image signal Gn' in the high gray-scale difference block.

Referring to FIG. 5, the high gray-scale difference duet-block 122, in which the high order bits of the present image signal Gn differ from the high order bits of the previous image signal Gn−1, is defined as two square blocks atop each other and containing for example the $10^{th}$, $11^{th}$, $12^{th}$, $13^{th}$, $14^{th}$, and $15^{th}$ LUT reference data points: f33, f43, f53, f34, f44, and f54.

The corrected image signal Gn' is computed by third interpolation equation F3 in the high gray-scale difference duet-block 122. Details of the calculation procedure of the third interpolation equation F3 will now be described.

Fifth reference equation ƒA3 is formed as a second-order function and has as its input parameters, the $10^{th}$ to $12^{th}$ LUT reference data points: f33, f43, and f53 existing on a third column line CL3 of the high gray-scale difference duet-block 122, and the column component of the corrected image signal Gn' may be calculated through fifth reference equation ƒA3.

Fifth reference equation ƒA3 is defined as Equation 9.

$$fA3 = a_3 y^2 + b_3 y + c_3, \quad \text{Equation 9}$$

$$\text{wherein } a_3 = \frac{1}{4N}(f53 - 2f43 + f33),$$

$$b_3 = \frac{1}{4N}(-f53 + 4f43 - 3f33) - \frac{y3}{2N^2}(f53 - 2f43 + f33),$$

$$\text{and } c_3 = f33 - a_3 y3 - b_3 y3$$

In Equation 9, y denotes a value obtained by dividing the low order bits of the present image signal Gn by N, and $y^4$ denotes the value of y used to obtain the $10^{th}$ reference data f33 from fifth reference equation ƒA3.

Sixth reference equation ƒB3 is formed as a second-order equation and is computed based on $13^{th}$ to $15^{th}$ reference data f34, f44, and f54 existing on a fourth column line CL4 in the high gray-scale difference block 122, and a column component of the corrected image signal Gn' may be calculated through sixth reference equation ƒB3.

Sixth reference equation ƒB3 is defined as Equation 10.

$$fB3 = a'_3 y^2 + b'_3 y + c'_3, \quad \text{Equation 10}$$

$$\text{wherein } a'_3 = \frac{1}{4N}(f54 - 2f44 + f34),$$

$$b'_3 = \frac{1}{4N}(-f54 + 4f44 - 3f34) - \frac{y4}{2N^2}(f54 - 2f44 + f34),$$

$$\text{and } c'_3 = f34 - a'_3 y4^2 - b'_3 y4.$$

In Equation 10, y denotes a value obtained by dividing the low order bits of the present image signal Gn by N, and $y^4$ denotes a value of y used to obtain $13^{th}$ reference data f34 from sixth reference equation ƒB3.

Third interpolation equation F3 is defined by a proportional equation of fifth and sixth reference equations ƒA3 and ƒB3.

The following proportional equation is established in the high gray-scale difference duet-block 122.

$$N{:}x=(fB3-fA3){:}(F3-fA3) \quad \text{Equation 11}$$

In Equation 11, N denotes the interval between blocks, and x is a value obtained by dividing the low order bits of the previous image signal Gn−1 by N.

Accordingly, third interpolation equation F3 is defined as Equation 12.

$$F3 = \left(\frac{a'_3}{N}x - \frac{a_3}{N}x + a_3\right)y^2 + \left(\frac{b'_3}{N}x - \frac{b_3}{N}x + b_3\right)y + \frac{c_3 + c_3}{N}x + c_3 \quad \text{Equation 12}$$

In Equation 12, N denotes the interval between blocks, x is a value obtained by dividing the low order bits of the previous image signal Gn−1 by N, and y is a value obtained by dividing the low order bits of the present image signal Gn by N.

The corrected image signal Gn' is thus obtained by using third interpolation equation for deriving F3 calculated through fifth and sixth reference equations ƒA3 and ƒB3 formed as the second-order equations when in the high-gray scale difference duet block 122 as described above, so that the present image signal Gn may be more correctly interpolated.

Figure 6:
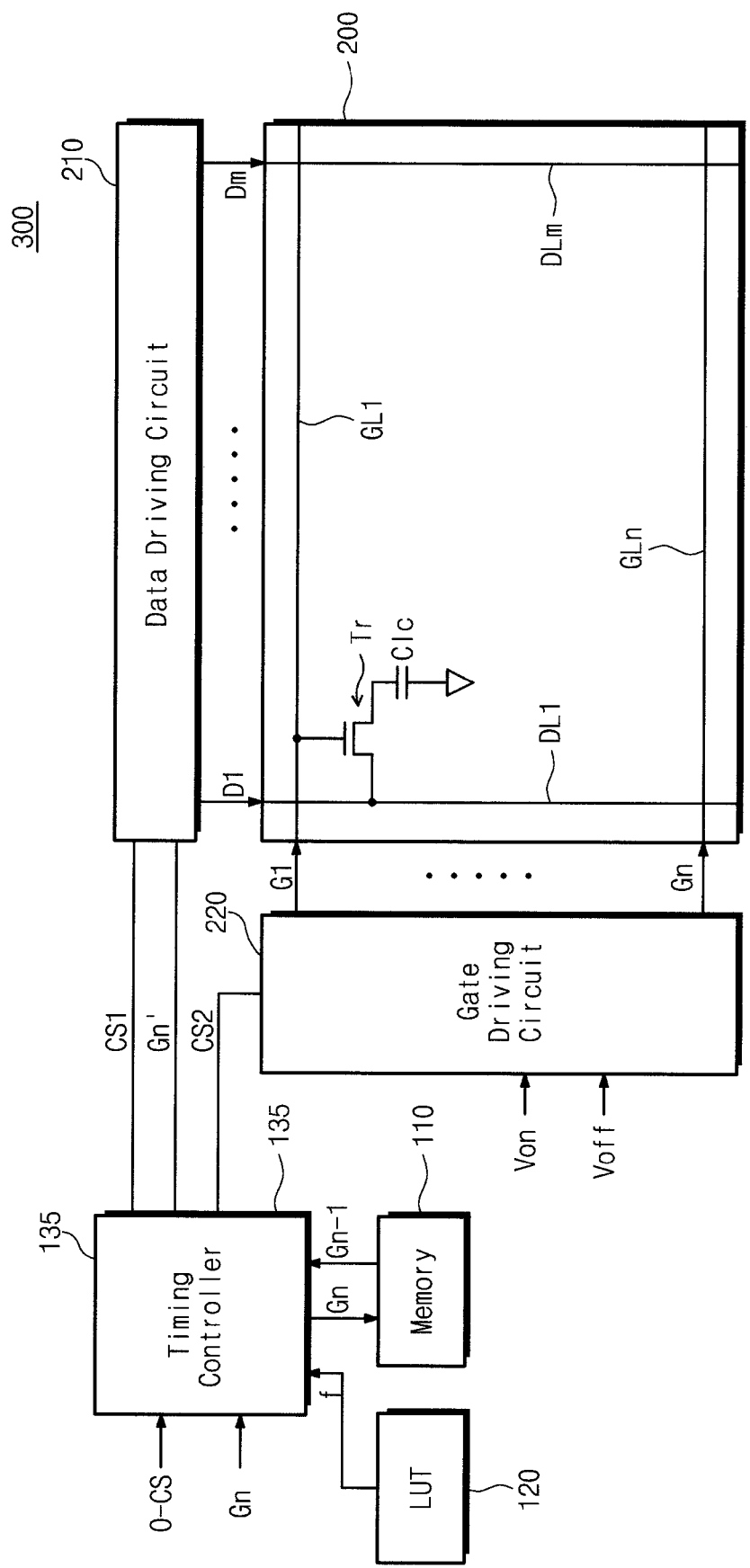
FIG. 6 is a block diagram showing an exemplary embodiment of a display apparatus including an interpolation device similar to that shown in FIG. 1.

FIG. 6 is a block diagram showing an exemplary embodiment of a display apparatus including an interpolation device corresponding to the one shown in FIG. 1. In FIG. 6, the same reference numerals denote similar elements as in FIG. 1, and thus the detailed descriptions thereof will be omitted in order to avoid redundancy.

Referring to FIG. 6, a display apparatus 300 includes a timing controller 135, a look-up table 120, a memory 110, a data driving circuit 210, a gate driving circuit 220, and a LCD display panel 200.

The timing controller 135 receives an external control signal 0-CS and a present image signal Gn from an external device. In the present exemplary embodiment, the external control signal 0-CS includes a vertical synchronization signal, a horizontal synchronization signal, a main clock, and a data enable signal. The timing controller 600 generates a data control signal CS1 and a gate control signal CS2 based on the external signal 0-CS.

The data control signal CS1 is used to control the operation of the data driving circuit 210 and provided to the data driving circuit 210. The data control signal CS1 includes a horizontal start signal used to start the operation of the data driving circuit 210, an inversion signal used to invert the polarity of data voltage, and an output indicating signal used to determine output time of the data voltage from the data driving circuit 210.

The gate control signal CS2 is used to control the operation of the gate driving circuit 220 and provided to the gate driving circuit 220. The gate control signal CS2 includes a vertical start signal used to start the operation of the gate driving circuit 220, a gate clock signal used to determine output time of a gate pulse, and an output enable signal used to determine the pulse width of the gate pulse.

Upon receiving the present image signal Gn, the timing controller 135 reads out the previous image signal Gn−1 which has been previously stored in the memory 110, and then writes the present image signal Gn into the memory 110.

The timing controller 135 reads from the LUT 120, the reference data f corresponding to the high order bits of the present image signal Gn and the high order bits of the previous image signal Gn−1 among reference data which have been previously stored in the look-up table 120.

The timing controller 135 includes an ALU (not shown) which creates the corrected image signal Gn' by substituting the reference data f and the low order bits of the present image signal Gn and the previous image signal Gn−1 into one of the pre-established interpolation equations (e.g., first to third interpolation equations F1 to F3 shown in FIGS. 4 and 5). The corrected image signal Gn' is applied to the data driving circuit 210 in synchronization with the data control signal CS1.

In the present exemplary embodiment, the timing controller 135 is prepared in the form of one monolithic integrated circuit chip, and includes the arithmetic unit (ALU) 130 shown in FIG. 1. In addition, the memory 110 and the look-up table 120 may be embedded in monolithic integrated circuit chip that includes the timing controller 135. The LUT may be a nonvolatile programmable memory such as a Flash memory. Values may be programmed to correspond with a model of the TFT, and the capacitance $C_{LCD}$ as determined by experimental evaluation of a given LCD panel 200.

The data driving circuit 210 receives the corrected image signal Gn' in synchronization with the control signal CS1 from the timing controller 135. In addition, the data driving circuit 210 receives gamma reference voltages generated from a gamma reference voltage generator (not shown) to convert the corrected image signal Gn' into first to $m^{th}$ data voltages D1 to Dm based on the gamma reference voltages and output first to $m^{th}$ data voltages D1 to Dm.

The gate driving circuit 220 receives a gate-on voltage Von and a gate-off voltage Voff generated from a DC/DC converter (not shown) to sequentially output first to $n^{th}$ gate pulses G1 to Gn in synchronization with the gate control signal CS2 generated from the timing controller 135.

The display panel 200 includes a plurality of data lines DL1 to DLm and a plurality of gate lines GL1 to GLn. The data lines DL1 to DLm are electrically connected to the data driving circuit 210 to receive the first to $m^{th}$ data voltages D1 to Dm. The gate lines GL1 to GLn are electrically connected to the gate driving circuit 220 to sequentially receive the first to $n^{th}$ gate pulses G1 to Gn.

The display panel 200 includes a plurality of pixel areas in a matrix configuration defined by the data lines DL1 to DLm and the gate lines GL1 to GLn, and each pixel area includes a thin film transistor Tr and a liquid crystal capacitor Clc.

As shown in FIG. 6, in the first pixel area, a gate electrode of the thin film transistor Tr is connected to the first gate line GL1, and a source electrode of the thin film transistor Tr is connected to the first data line DL1, and a drain electrode of the thin film transistor Tr is connected to a first electrode of the liquid crystal capacitor Clc. Accordingly, the thin film transistor Tr applies the first data voltage D1 to the pixel electrode in response to the first gate pulse G1.

In the present exemplary embodiment, the display panel 200 includes an array substrate (not shown), a color filter substrate (not shown) facing the array substrate, and a liquid crystal layer (not shown) interposed between the array substrate and the color filter substrate.

The array substrate includes the gate lines GL1 to GLn, the data lines DL1 to DLm, the thin film transistor Tr, and the pixel electrode. Meanwhile, the color filter substrate includes a common electrode, which is a second electrode of the liquid crystal capacitor CLc, and a common voltage is applied to the common electrode as a reference voltage. The liquid crystal layer interposed between the pixel electrode and the common electrode serves as a dielectric layer. Therefore, the liquid crystal capacitor CLc is charged with a voltage corresponding to the potential difference between the data voltage applied to the pixel electrode and the common voltage.

Liquid crystal molecules of the liquid crystal layer are aligned by the voltage in a predetermined direction, and the aligned liquid crystal molecules adjust the transmittance of light supplied from a rear surface of the display panel 200. Accordingly, a screen image corresponding to the present image signal Gn may be displayed onto the display panel 200.

Thanks to the interpolation device defined in the ALU 130, the display apparatus having the same, and operating according to the interpolation methods of the present disclosure, receives a corrected image signal that is calculated by using interpolation equations formed as second-order equations even in the low gray-scale difference quad blocks where the high order bits of the present image signal are the same (or almost the same) as the high order bits of the previous image signal, so that interpolation errors may be reduced in the low gray-scale difference quad-blocks.

Although the exemplary embodiments have been described, it is understood that the present disclosure of invention should not be limited to these exemplary embodiments but various changes and modifications can be made to the same by one ordinary skilled in the art in light of and within the spirit and scope of the present disclosure.

What is claimed is:

1. A display apparatus comprising:
   a memory that stores an image signal in one frame unit, in which an image signal of a previous frame (a previous image signal), which is previously stored, is read out from the memory during a present frame, and an image of the present frame (a present image signal) is written into the memory;
   a look-up table that stores plural reference data and receives the previous image signal from the memory and the present image signal to output reference data corresponding to high order bits of the present image signal and high order bits of the previous image signal; and
   a timing controller that receives low order bits of the present image signal, low order bits of the previous image signal, and the reference data to output a corrected image signal, and receives a control signal from an external device to output a data control signal and a gate control signal, in which the timing controller applies a first second-order interpolation equation when the high order bits of the present image signal are identical to the high order bits of the previous image signal and applies a second second-order interpolation equation, which is different from the first second-order interpolation equation, when the high order bits of the present image signal are different from the high order bits of the previous image signal;

a data driving circuit that receives the corrected image signal in synchronization with the data control signal and converts the corrected image signal into data voltage to output the data voltage;

a gate driving circuit that sequentially outputs gate pulses in synchronization with the gate control signal; and a display panel that receives the data voltage in response to the gate pulse to displays an image thereon.

2. The display apparatus of claim 1, wherein a first block, in which the high order bits of the present image signal are identical to the high order bits of the previous image signal in the look-up table, comprises a diagonal line of the look-up table, and the first block comprises a lower triangular block, which is defined by first to third column reference data consecutively existing at a left-side border of the first block and the diagonal line, and an upper triangular block, which is defined by fourth to sixth column reference data existing at a right-side border of the first block and the diagonal line.

3. The display apparatus of claim 2, wherein the timing controller outputs the corrected image signal existing in the lower triangular block by using a first interpolation equation, which is obtained by a proportional equation of a first reference equation based on the first to third column reference data and a second reference equation based on reference data on the diagonal line, if the present image signal is greater than the previous image signal, and outputs the corrected image signal existing in the upper triangular block by using a second interpolation equation, which is obtained by a proportional equation of a third reference equation based on the fourth to sixth column reference data and a fourth reference equation based on the reference data on the diagonal line, if the present image signal is smaller than the previous image signal.

4. The display apparatus of claim 1, wherein the look-up table outputs seventh to ninth column reference data existing at a left-side border of a second block, which the high order bits of the present image signal differ from the high order bits of the previous image signal, and $10^{th}$ to $12^{th}$ column reference data existing at a right-side border of the second block.

5. The display apparatus of claim 4, wherein the timing controller outputs the corrected image signal existing in the second block by using a third interpolation equation obtained by a proportional equation of a fifth reference equation based on the seventh to ninth column reference data and a sixth reference equation based on the $10^{th}$ to $12^{th}$ column reference data.

6. An interpolation method for use in a display apparatus, the method comprising:

receiving an image signal of a previously displayed frame of the display apparatus (a previous image signal) and an image signal of a to-be-displayed present frame (a present image signal);

outputting reference data corresponding to high order bits of the present image signal and high order bits of the previous image signal; and receiving low order bits of the present image signal, low order bits of the previous image signal, and the reference data and obtaining a corrected image signal by applying a first second-order interpolation equation when the high order bits of the present image signal are identical to the high order bits of the previous image signal and applying a second second-order equation, which is different from the first second-order equation, when the high order bits of the present image signal are different from the high order bits of the previous image signal.

7. The interpolation method of claim 6, wherein the corrected image signal is obtained through a first interpolation equation if the high order bits of the present image signal are identical to the high order bits of the previous image signal, and if the present image signal is greater than the previous image signal, and the first interpolation equation is defined as $$F1 = (1-b1)x + b21 - a1y - a1xy + (f00 - c1)\frac{x}{y} + a1y^2 + c1,$$

in which $$a1 = \frac{1}{4N}(f20 - 2f10 + f00)$$

$$b1 = \frac{1}{4N}(-f20 + 4f10 - 3f00) - \frac{y0}{2N^2}(f20 - 2f10 + f00),$$

$c1=f00-a1y0^2-b1y0$, $f00$ denotes first reference data corresponding to the high order bits of the present image signal and the high order bits of the previous image signal, $f10$ denotes second reference data separated from $f00$ by N corresponding to one block in a column direction, $f20$ denotes third reference data separated from $f10$ by $N$ in a column direction, x denotes a value obtained by dividing the lower order bits of the previous image signal by N, y denotes a value obtained by dividing the low order bits of the present image signal by N, and y0 denotes a value of y corresponding to the first reference data.

8. The interpolation method of claim 6, wherein the corrected image signal is obtained through a second interpolation equation if the high order bits of the present image signal are identical to the high order bits of the previous image signal, and if the present image signal is smaller than the previous image signal, and the second interpolation equation is defined as $$F2 = (1-b2)x + b2y - a2xy + (f22 - c2)\frac{x}{y} + a2y^2 + c2,$$

in which $$a2 = \frac{1}{4N}(f02 - 2f12 + f22),$$

$$b1 = \frac{1}{4N}(-f02 + 4f12 - 3f22) - \frac{y0}{2N^2}(f02 - 2f12 + f22),$$

$c2=f22-a2y2^2-b2y2$, $f22$ denotes fourth reference data corresponding to the high order bits of the present image signal and the high order bits of the previous image signal, $f12$ denotes fifth reference data separated from $f22$ by N in a column direction, $f02$ denotes sixth reference data separated from $f12$ by N in a column direction, x denotes a value obtained by dividing the lower order bits of the previous image signal by N, y denotes a value obtained by dividing the low order bits of the present image signal by N, and y2 denotes a value of y corresponding to the fourth reference data.

9. The interpolation method of claim 6, wherein the corrected image signal is obtained through a third interpolation equation if the high order bits of the present image signal differ from the high order bits of the previous image signal, and the third interpolation equation is defined as $$F3 = \left(\frac{a'3}{N}x - \frac{a3}{N}x + a3\right)y^2 + \left(\frac{b'3}{N}x - \frac{b3}{N}x + b3\right)y + \frac{c'3 + c3}{N}x + c3,$$

in which $$a3 = \frac{1}{4N}(f53 - 2f43 + f33),$$

$$b3 = \frac{1}{4N}(-f53 + 4f43 - 3f33) - \frac{y3}{2N^2}(f53 - 2f43 + f33),$$

$$c3 = f33 - a3y3 - b3y3,$$

$$a'3 = \frac{1}{4N}(f54 - 2f44 + f34),$$

$$b'3 = \frac{1}{4N}(-f54 + 4f44 - 3f34) - \frac{y4}{2N^2}(f54 - 2f44 + f34),$$

$$c'3 = f34 - a'3y4^2 - b'3y4,$$

$f33$ denotes seventh reference data corresponding to the high order bits of the present image signal and the high order bits of the previous image signal, $f43$ denotes eight reference data separated from $f33$ by N in a column direction, $f53$ denotes ninth reference data separated from $f43$ by N in a column direction, $f34$ denotes $10^{th}$ reference data separated from $f33$ by N in a row direction, $f44$ denotes $11^{th}$ reference data separated from $f43$ by N in a row direction, $f54$ denotes $12^{th}$ reference data separated from $f53$ by N in a row direction, x denotes a value obtained by dividing the lower order bits of the previous image signal by N, y denotes a value obtained by dividing the low order bits of the present image signal by N, $y^3$ denotes a value of y corresponding to the seventh reference data, and $y^4$ denotes a value of y corresponding to the $10^{th}$ reference data.

10. A method for compensating for charge and discharge characteristics of a Liquid Crystal Display (LCD) pixel unit in cases where a current new image signal level is close to, but not substantially equivalent to a previous one of a frame ago and where a current new image signal level is coarsely different and substantially further away from the previous one of a frame ago, where closeness is determined as a function of resolution provided by a predefined lookup table used to model response characteristics of the LCD pixel unit to a drive pulse as a function of a previous charge state relative to a next-to-be attained charge state, the method comprising:

(a) automatically determining whether the current new image signal level is close to, but not substantially equivalent to a previous one of a frame ago and if so, automatically determining whether the current new image signal level is greater than, less than the previous one of a frame ago;

(b) using a first interpolation scheme in response to determination that the current new image signal level is close but greater than the previous one of a frame ago; and (c) using a different second interpolation scheme in response to determination that the current new image signal level is close but less than the previous one of a frame ago.

11. The method of claim 10, further comprising:

(d) using no interpolation scheme in response to determination that the current new image signal level is substantially equivalent to the previous one of a frame ago.

12. The method of claim 11, further comprising:

(e) using a different third interpolation scheme in response to determination that the current new image signal level is substantially different and further away from the previous one of a frame ago.

13. The method of claim 12, further comprising:

(f) applying a drive signal to the modeled LCD pixel unit, where the drive signal is a function of the used one of said first through third or no interpolation scheme as set forth in steps (b)-(e).

14. An automated apparatus for automatically compensating for charge and discharge characteristics of a Liquid Crystal Display (LCD) pixel unit in cases where a current new image signal level is close to, but not substantially equivalent to a previous one of a frame ago and where a current new image signal level is coarsely different and substantially further away from the previous one of a frame ago, where closeness is determined as a function of resolution provided by a predefined lookup table used to model response characteristics of the LCD pixel unit to a drive pulse as a function of a previous charge state relative to a next-to-be attained charge state, the apparatus comprising:

(a) determining means for automatically determining whether the current new image signal level is close to, but not substantially equivalent to a previous one of a frame ago and if so, automatically determining whether the current new image signal level is greater than, less than the previous one of a frame ago;

(b) first interpolation means that uses a first interpolation scheme in response to determination by the determining means that the current new image signal level is close but greater than the previous one of a frame ago; and (c) second interpolation means that uses a different second interpolation scheme in response to determination by the determining means that the current new image signal level is close but less than the previous one of a frame ago.

15. An interpolation device for use in a display apparatus the device comprising:

a frame memory for storing previous image data corresponding to a previous frame displayed on the display apparatus;

a look-up table coupled to the frame memory and storing plural reference data and receives the previous image signal from the memory and the present image signal to output reference data corresponding to a predetermined number of high order bits of the present image signal and a predetermined number of high order bits of the previous image signal output from the frame memory; and an arithmetic unit that receives low order bits of the present image signal, low order bits of the previous image signal, and the reference data from the look-up table and responsively outputs a corrected image signal by a first second-order interpolation process, a second second-order interpolation process or no interpolation process, wherein the arithmetic unit uses the first second-order interpolation process when the high order bits of the present image signal are identical to the high order bits of the previous image signal and uses the second second-order interpolation process which is different from the first second-order interpolation process, when the high order bits of the present image signal are different from the high order bits of the previous image signal.

16. The interpolation device of claim 1, wherein the look-up table outputs at least three column reference data existing on one column line at a border of a first block, where the high order bits of the present image signal are identical to the high order bits of the previous image signal, and reference data existing on a diagonal line of the look-up table.

17. The interpolation device of claim 16, wherein the first block is subdivided into a lower triangular block defined by a first column line at a left-side border of the first block and the diagonal line of the look-up table; and an upper triangular block defined by a second column line at a right-side border of the first block and the diagonal line of the look-up table and the arithmetic unit uses different interpolation processes in response to input data corresponding to the upper triangular block rather than the lower triangular block.

18. The interpolation device of claim 17, wherein the correction data signal exists in the lower triangular block if the present image signal is greater than the previous image signal, and exists in the upper triangular block if the present image signal is smaller than the previous image signal.

19. The interpolation device of claim 18, wherein a column component of the correction data signal is generated according to a first reference equation, which is formed as a second-order equation, based on first, second, and third column reference data sequentially existing on the first column line in the lower triangular block, and the first reference equation is defined as $$fA1 = a1y^2 + b1y + c1$$

wherein $$a1 = \frac{1}{4N}(f20 - 2f10 + f00)$$

$$b1 = \frac{1}{4N}(-f20 + 4f10 - 3f00) - \frac{y0}{2N^2}(f20 - 2f10 + f00),$$

$$c1 = f00 - a1y0^2 - b1y0,$$

where $f00$, $f10$, and $f20$ denote the first, second, and third column reference data, respectively, N denotes an interval between the first and second column reference data, y denotes a value obtained by dividing the low order bits of the present image signal by N, and y0 denotes a value of y used to calculate the first column reference data from the first reference equation.

20. The interpolation device of claim 19, wherein, the reference data existing on the diagonal line in the lower triangular block are calculated through a second reference equation formed as a first-order equation, and the second reference equation is defined as $fB1=f00+y$, wherein $f00$ denotes the first column reference data, and y denotes a value obtained by dividing the low order bits of the present image signal by N.

21. The interpolation device of claim 20, wherein an interpolation equation is obtained by a proportional equation of the first and second reference equations in the lower triangular block, the proportional equation satisfies x:y=(F1−$fA1$):($fB1-fA1$), and the interpolation equation is defined as $$F1 = (1-b1)x + b1y - a1xy + (f00-c1)\frac{x}{y} + a1y^2 + c1$$

by the proportional equation, in which x denotes a value obtained by diving the low order bits of the previous image signal by N.

22. The interpolation device of claim 18, wherein a column component of the corrected image signal is calculated through a third reference equation, which is formed as a second-order equation, based on fourth, fifth, and sixth column reference data existing on the second column line in the upper triangular block, and the third reference equation is defined as $fA2=a2y^2+b2y+c2$, in which $$a2 = \frac{1}{4N}(f02 - 2f12 + f22),$$

$$b1 = \frac{1}{4N}(-f02 + 4f12 - 3f22) - \frac{y0}{2N^2}(f02 - 2f12 + f22),$$

$c2=f22-a2y2^2-b2y\,2$, $f02$, $f12$, and $f22$ denote the fourth, fifth, and sixth column reference data, respectively, N denotes the interval between the fourth and fifth column reference data, y denotes a value obtained by dividing the low order bits of the present image signal by N, and y2 denotes a value of y used to obtain the sixth column reference data $f22$ from the third reference equation.

23. The interpolation device of claim 22, wherein the reference data existing on the diagonal line are calculated through a fourth reference equation formed as a first-order equation in the upper triangular block, and the fourth reference equation is defined as $fB2=f22+y$, in which $f22$ denotes the sixth column reference data, and Y is a value obtained by dividing the low order bits of the present image signal by N.

24. The interpolation device of claim 23, wherein an interpolation equation is obtained by a proportional equation of the third and fourth reference equations in the upper triangular block, the proportional equation satisfies x:y=($fA2$−F2):($fA2-fB2$), and the interpolation equation is defined as $$F2 = (1-b2)x + b2y - a2y - a2xy + (f22-c2)\frac{x}{y} + a2y^2 + c2$$

by the proportional equation, in which x denotes a value obtained by dividing the low order bits of the previous image signal by N.

25. The interpolation device of claim 24, wherein the look-up table outputs at least left-side three column reference data existing on a third column line at a left-side border of a second block, where the high order bits of the present image signal differ form the high order bits of the previous image signal, and at least three right-side reference data existing on a fourth column line at a right-side border of the second block.

26. The interpolation device of claim 25, wherein a fifth reference equation formed as a second-order equation is calculated based on seventh, eighth, and ninth column reference data existing on the third column line, a column component of the corrected image signal is calculated through the fifth reference equation, and the fifth reference equation is defined as $fA3=a3y^2+b3y+c3$, wherein $$a3 = \frac{1}{4N}(f53 - 2f43 + f33),$$

$$b3 = \frac{1}{4N}(-f53 + 4f43 - 3f33) - \frac{y3}{2N^2}(f53 - 2f43 + f33),$$

$c3=f33-a3y3-b3y3$, $f33$, $f43$, and $f53$ denote the seventh, eighth, and ninth column reference data, respectively, N denotes an interval between the seventh and eighth column reference data, y denotes a value obtained by dividing the low order bits of the present image signal by N, and $y^3$ denotes a value of y used to obtain the seventh column reference data from the fifth reference equation.

27. The interpolation device of claim 26, wherein a sixth reference equation formed as a second-order equation is calculated based on $10^{th}$, $11^{th}$, and $12^{th}$ column reference data existing on the fourth column line, the column component of the corrected image signal is calculated through the sixth reference equation, and the sixth reference equation is defined as $fB3=a'3y^2+b'3y+c'3$, wherein $$a'3 = \frac{1}{4N}(f54 - 2f44 + f34),$$

$$b'3 = \frac{1}{4N}(-f54 + 4f44 - 3f34) - \frac{y4}{2N^2}(f54 - 2f44 + f34),$$

$c'3=f34-a'3y4^2-b'3y4$, $f34$, $f44$, and $f54$ denote the $10^{th}$, $11^{th}$, and $12^{th}$ column reference data, respectively, y denotes a value obtained by dividing the low order bits of the present image signal by N, and y4 denotes a value of y used to obtain the $10^{th}$ column reference data from the sixth reference equation.

28. The interpolation device of claim 27, wherein an interpolation equation is obtained by a proportional equation of the fifth and sixth reference equations in the second block, the proportional equation is defined as N:x=(fB3−fA3):(F3−fA3), and the interpolation equation is defined as $$F3 = \left(\frac{a'3}{N}x - \frac{a3}{N}x + a3\right)y^2 + \left(\frac{b'3}{N}x - \frac{b3}{N}x + b3\right)y + \frac{c'3 + c3}{N}x + c3,$$

in which x denotes a value obtained by diving the low order bits of the previous image signal by N.

29. The interpolation device of claim 1, wherein a column axis of the look-up table represents the present image signal, and a row axis of the look-up table represents the previous image signal.

30. The interpolation device of claim 29, wherein the high order bits of the present image signal and the previous image signal include $\alpha$ bits, and the look-up table stores $(2^{\alpha}+1) \times (2^{\alpha}+1)$ reference data corresponding to the high order bits of the present image signal and the previous image signal.

* * * * *